May 2, 1939.  F. J. BROWN  2,156,274
DETACHABLE BAIL FOR BASKETS OR HAMPERS
Filed May 26, 1936
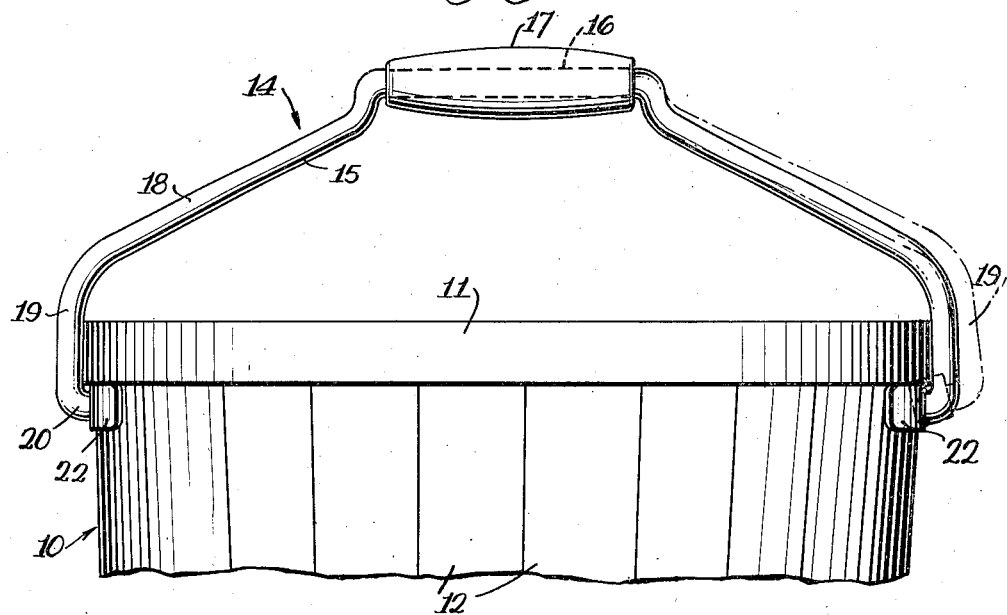
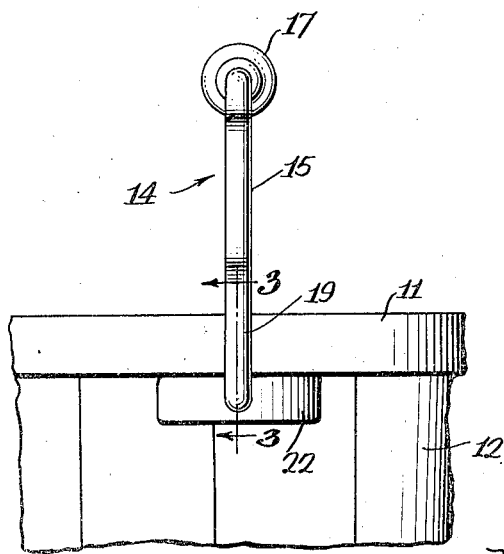
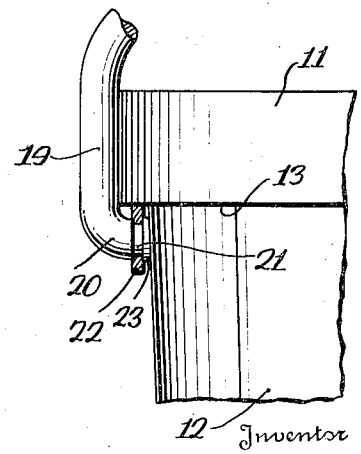
Inventor
F. J. Brown
By Miller & Miller
Attorneys Patented May 2, 1939

2,156,274

UNITED STATES PATENT OFFICE 2,156,274

DETACHABLE BAIL FOR BASKETS OR HAMPERS

Fred J. Brown, Egg Harbor City, N. J.

Application May 26, 1936, Serial No. 81,936

2 Claims. (Cl. 217—125)

This invention relates to a detachable hamper basket bail, and has for an object to provide an improved bail or handle which can be quickly and easily attached to and detached from hamper baskets, making the hamper basket much more easy to pick up and carry about as needed.

As a result of utilizing the bail or handle of this invention, it becomes easily possible to carry two loaded hamper baskets with less difficulty than is possible at present to carry a single hamper basket.

A further object of this invention is to provide a bail or handle for hamper baskets which may be inexpensively manufactured and sold and in use may be easily applied to or removed from a hamper basket without the necessity of any tools whatsoever.

With the foregoing and other objects in view as will hereinafter become apparent, this invention comprises the combinations of constructions and arrangements of parts hereinafter claimed, set forth, and illustrated in the accompanying drawing, wherein:

Figure 1 is a side elevation of the upper end of a hamper basket to which the bail of which invention is being applied.

Fig. 2 is a front elevation of Fig. 1 and

Fig. 3 is a sectional view taken on the line 3—3 of Fig. 2.

There is shown at 10 a conventional peach or hamper basket as illustrated of the use to which this invention is to be put. This basket 10 has an upper rim 11 encircling, but attached to the top of the slats 12 of which the basket may be constructed. As usual, these slats 12 taper inwardly toward the bottom of the basket and the lower end 13 of the rim or hoop 11 is therefore spaced from the outside of the slat 12.

The bail 14 of this invention includes a heavy wire 15 shaped substantially as shown. This wire 15 is provided with a substantially horizontal portion 16 about which is placed a wooden handle grip 17. On this horizontal portion 16 the wire 15 extends to angular portions 18 and then downwardly into vertical portions 19. The length of the vertical portions 19 are somewhat greater than the width of the rim or hoop 11.

Inturned ends 20 extend through apertures 21 in curved plates 22 and are peened or riveted over as at 23 to hold curved plates 22 securely thereto. The curved plates 22 have a curvature of substantially the same radius as that of the hoop or rim 11 and the distance between the vertical portions 19 of the wire 15 is substantially equal to the diameter of the hook or rim 11, while the distance between the two plates 22 is somewhat less than this same diameter.

In operation this bail may be applied to the basket by one hand when the basket is loaded with products. To do so, one of the plates 22 is placed under the lower edge 13 of the rim 11 and the wire 15 is then simply stretched to cause the distance between the vertical portions 19 to be temporarily increased allowing the plate 22 to slip over the opposite side of the hook or rim 11 and catch between the edges 13, the other vertical portion 19 of the wire moving to the position 19′ temporarily, as the handle 14 is being applied.

On releasing of the stretching process this other plate 22 hooks into position on the basket and the handle 14 is held securely in position due to the resiliency of the wire 15. The hand is then merely placed on the handle grip 16 and the basket may be picked up and carried in a convenient manner, it thus being possible to carry two of the baskets 10, one in each hand with the less disability than it is now possible to carry a single basket in both hands.

The novel features and the operation of this device will be apparent from the foregoing description. While the device has been shown in detail, it is obvious that this invention is not to be considered limited to the exact form disclosed, and that changes may be made therein within the scope of what is claimed, without departing from the spirit of the invention.

Having thus set forth and described the invention, what is claimed is:

1. A detachable and attachable hamper basket bail adapted for use with a hamper basket wherein the hamper basket includes an upper rim having its lower edge extending over the side of the basket; said basket bail comprising a single, resilient wire member having a vertical portion extending downwardly from each outer end thereof, the distance between the vertical portions being substantially equal to the diameter of the basket to which it is to be applied, inturned ends at the bottom of each vertical portion, and a curved plate secured to each inturned end adapted to be temporarily held beneath the basket upper rim by the resiliency of the bail to temporarily attach the bail to the basket.

2. A detachable and attachable hamper basket bail adapted for use with a hamper basket wherein the hamper basket includes an upper rim having its lower edge extending over the side of the basket; said basket bail comprising a single, resilient wire member having angular portions extending downwardly from each end of said horizontal portion, a vertical portion extending downwardly from each outer end thereof, the distance between the vertical portions being substantially equal to the diameter of the basket to which it is to be applied, inturned ends at the bottom of each vertical portion, and a curved plate secured to each inturned end adapted to be temporarily held beneath the basket upper rim by the resiliency of the bail to temporarily attach the bail to the basket, the curvature of said plate having a radius substantially equal to the radius of the basket.

FRED J. BROWN.